A. McC. BURTON.
FENDER.
APPLICATION FILED APR. 16, 1914.

1,230,463.

Patented June 19, 1917.
4 SHEETS—SHEET 1.

Witnesses
M. P. McKee
J. M. Bowie

Inventor
A. M. Burton

Alex. J. Wedderburn, Jr.
Attorney

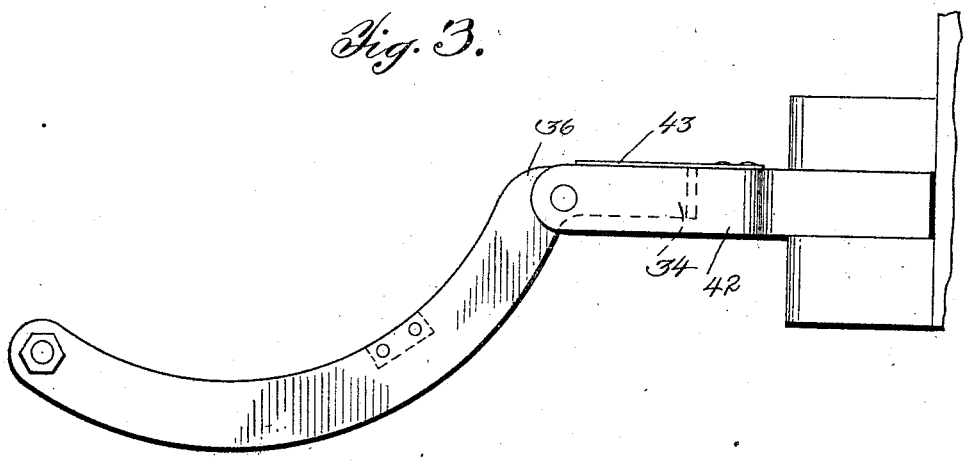
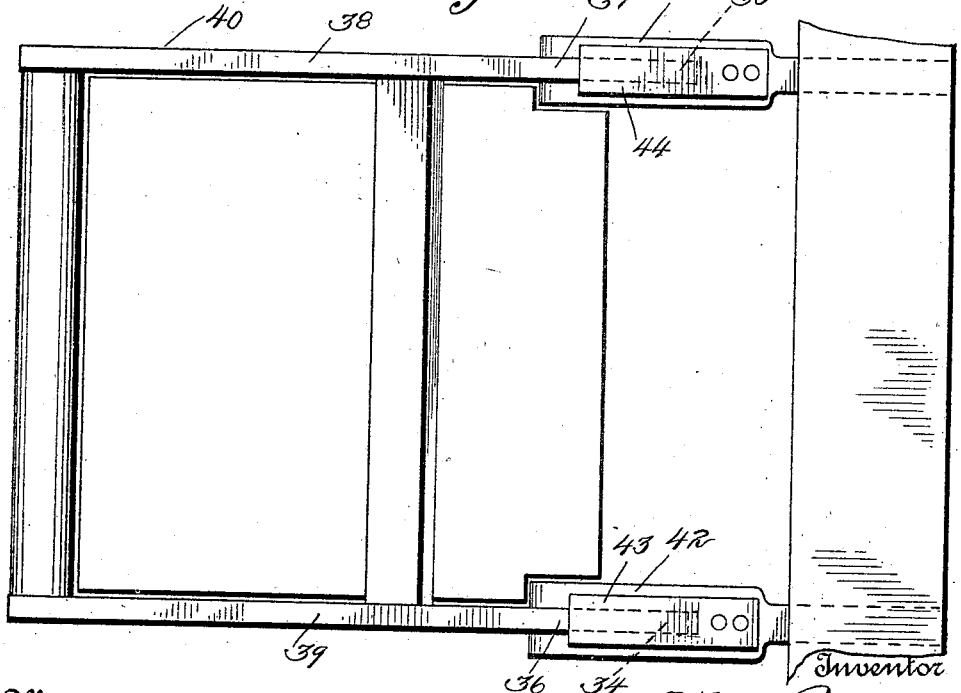

A. McC. BURTON.
FENDER.
APPLICATION FILED APR. 16, 1914.
1,230,463.
Patented June 19, 1917.
4 SHEETS—SHEET 3.
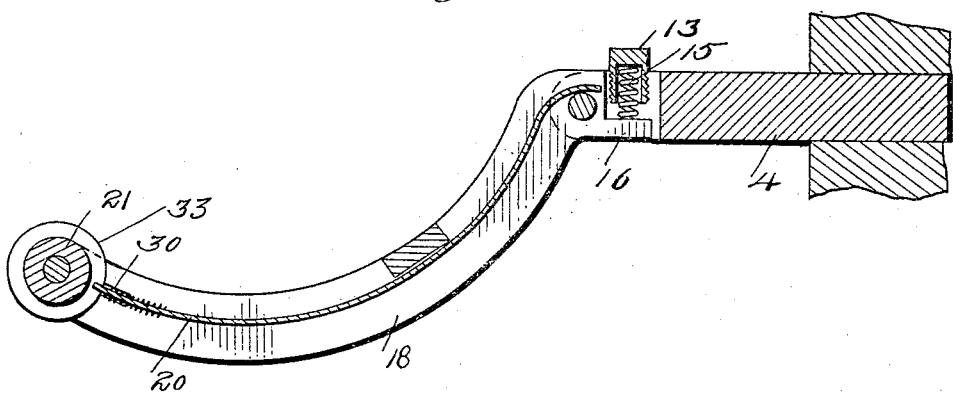
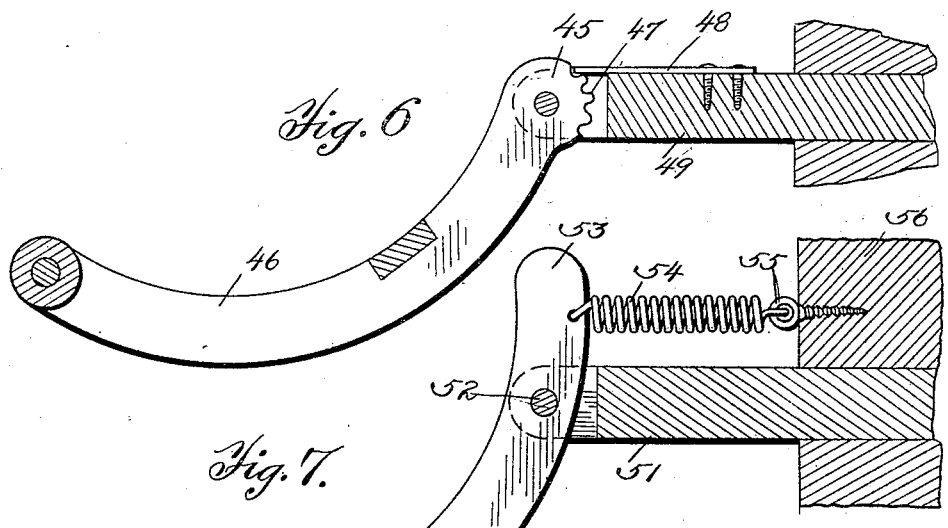
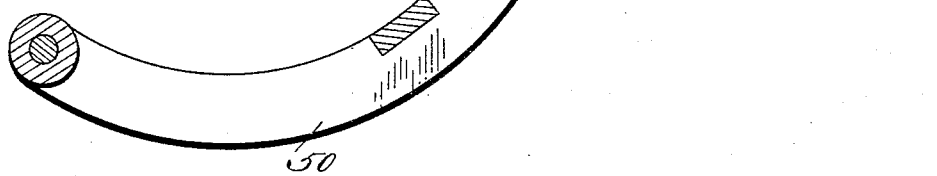
Witnesses
M. P. McKee
J. M. Bowie
Inventor
A. M. Burton
Alex. J. Wedderburn, Jr.
Attorney

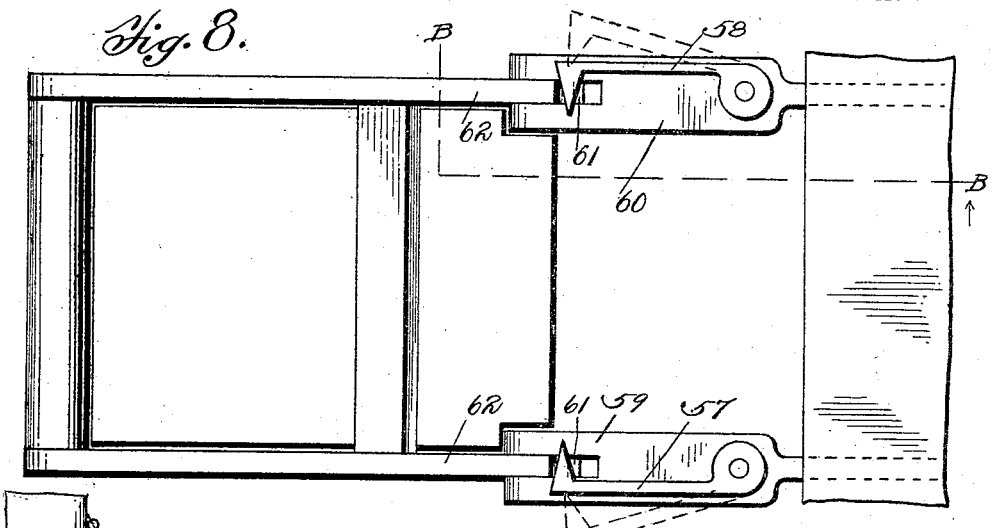
Fig. 8.
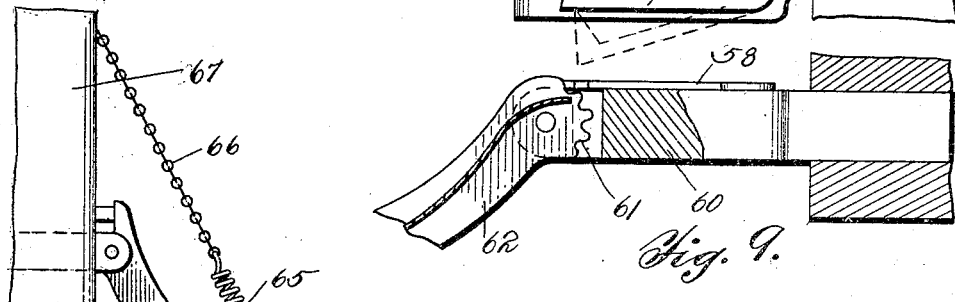
Fig. 9.
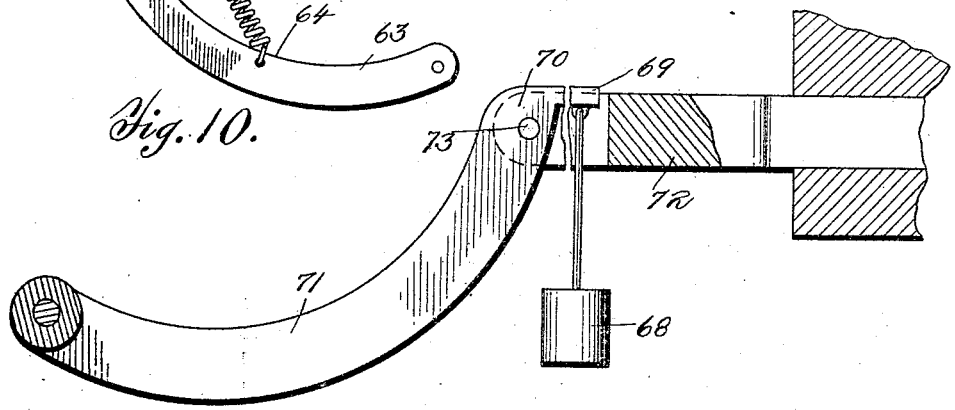
Fig. 10.
Fig. 11.

UNITED STATES PATENT OFFICE.

ALEXANDER McCORD BURTON, OF PITTSBURGH, PENNSYLVANIA.

FENDER.

1,230,463.

Specification of Letters Patent.

Patented June 19, 1917.

Application filed April 16, 1914. Serial No. 832,371.

*To all whom it may concern:*

Be it known that I, ALEXANDER M. BURTON, a citizen of the United States, residing at Pittsburgh, in the county of Allegheny and State of Pennsylvania, have invented certain new and useful Improvements in Fenders, of which the following is a specification.

This invention relates to improvements in fenders for automobiles and other vehicles and has for its object to provide a fender having a combined scoop and rear guard and means whereby the fender may be automatically dropped.

Another object of the invention is to provide a dirigible fender.

Still another object of the invention is to provide a combination of the fender scoop having means whereby said scoop may be held normally in a raised position.

Still another object of the invention is to provide a fender having means for breaking the shock of a contact.

With the above and other objects in view which will be more fully described in connection with the accompanying drawings, I have invented a fender in which—

Fig. 3, is a detail side elevational view of my fender showing a modified form thereof.

Fig. 4, is a top plan view of Fig. 3.

Fig. 5, is a section on line A—A of Fig. 1.

Fig. 6, is a view similar to Fig. 5, showing a modification of a fender suspending means.

Fig. 7, is a view similar to Fig. 6, showing still another modification.

Fig. 8, is a top plan view of another modification of the invention.

Fig. 9, is a section on line B—B of Fig. 8.

Fig. 10, is a side elevation showing still another modification of the fender suspending means.

Fig. 11, is a longitudinal sectional view of the invention showing a modified form of the fender-suspending means.

Figure 1:
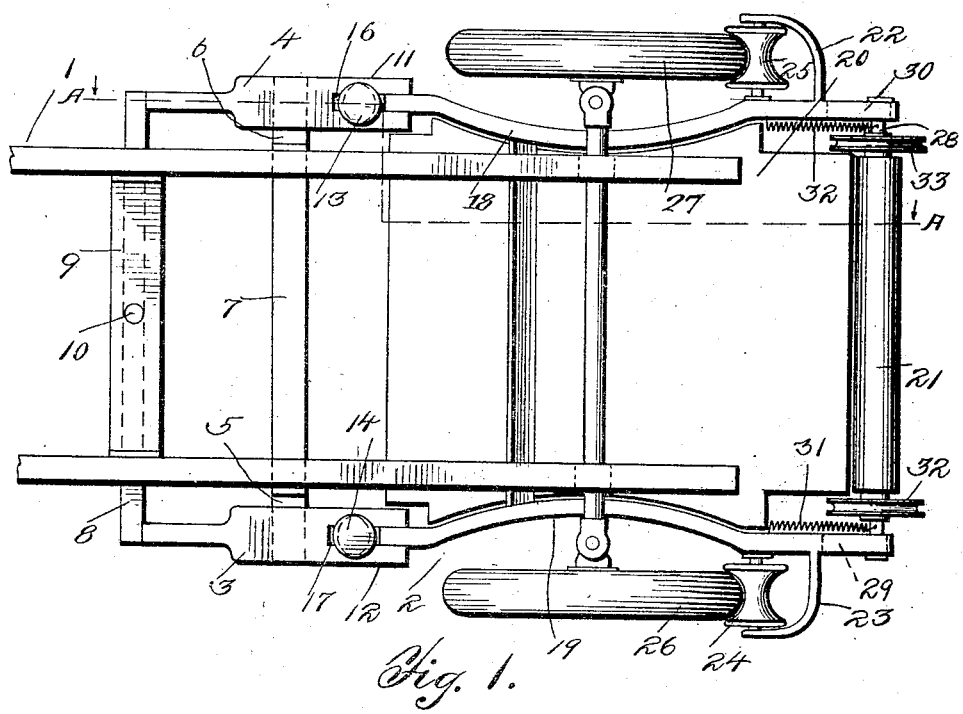
Figure 1, is a top plan view of my fender shown connected with the chassis of an automobile.
Figure 2:
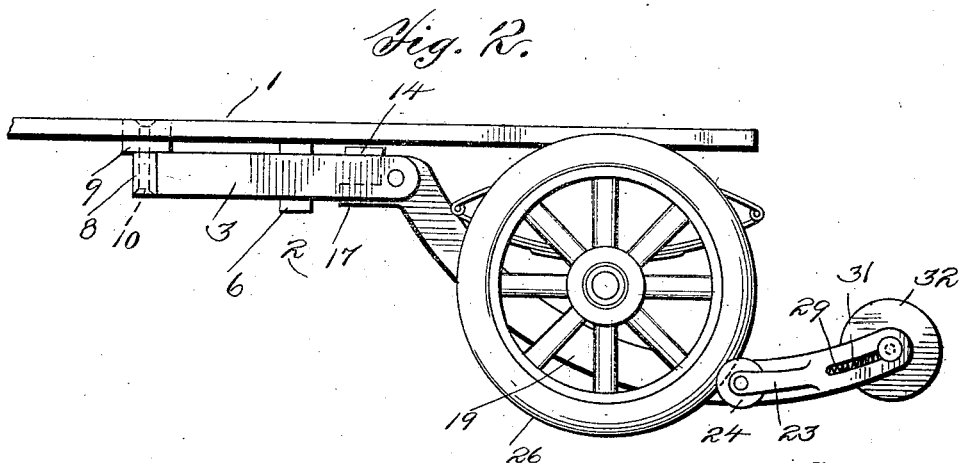
Fig. 2, is a side elevation of Fig. 1.

Like reference characters designate like or corresponding parts throughout the different views in which 1, indicates an automobile chassis upon which is mounted a fender 2, by means of supports 3 and 4, slidable on the ends 5 and 6, of the cross-beam 7. The arms 3 and 4, are rigidly connected by means of the cross arm 8, which is pivotally connected to the frame member 9, by means of a bolt 10.

The outer ends 11 and 12, of the supports 3 and 4, are bifurcated and have inverted cup-members 13 and 14, screw-threaded thereinto. Strong spiral springs 15 are seated in and project below said members 13 and 14, and engage normally horizontal lugs, 16 and 17, on the scoop frame members 18 and 19, these members being curved so that the fabric 20, held therebetween, will form the bottom and rear walls of the fender, the action of said springs 15, being to hold said fender in a normally raised position. However, when the roller end 21, of the fender strikes an object which falls upon the fender, said fender is caused to lower against the tension of the springs 15, and thereby break the force of the fall.

Brackets 22 and 23, in conjunction with said members 18 and 19, support the rollers 24 and 25, which normally engage the peripheries of the wheels 26 and 27. By means of this arrangement, when the wheels have turned out of the straight course, the fender is turned in the same direction taken by said wheels. The roller 21, is mounted upon a shaft 28, which is slidable in the slots 29 and 30, (shown dotted in Fig. 1), provided in the members 18 and 19, therefor, and springs 31 and 32, normally force said shaft to the outer ends of said slots. Wheels 32 and 33 are also mounted upon the shaft 28, and contact the surface and support the outer end of said fender when weight forces the same down against the tensions of said springs 15.

In Figs. 3 and 4, I show a modification of the fender supporting means which consists of horizontally disposed supports 34 and 35, (which are shown dotted in Figs. 3 and 4) which project from the pivotal portion 36 and 37, of the frame members 38 and 39, of the fender 40. The upper surface of members 34 and 35 is normally flush with the upper surface of the bifurcated arms 41 and 42, within which they operate. Fixedly secured to the rear portion of said arms 41 and 42, are leaf springs 43 and 44, which seat upon members 34 and 35, and normally hold the fender 40, in a raised position. However, when a body drops on said fender, the weight of said body and fender bears against the tension of said springs 43 and 44, whereby said fender is caused to lower and break the shock of the fall of the body upon said fender.

In Fig. 6, I show a slight modification of Fig. 3 in which the upper portion 45, of the frame member 46, is provided with teeth 47, adapted to be engaged by leaf spring 48, fixed to the arm 49.

In Fig. 7, another modification is shown in which the frame member 50 extends above the bifurcated arm 51 within which it is pivoted, as at 52. The upwardly extending portion 53 is connected to one end of a coil spring 54, the other end of which is connected to the eye 55, of the member 56, the action of said spring upon said frame arm 50, being to hold said arm in a normally raised position. However, said spring will yield to the weight of a body upon said fender and break the shock of said fall.

In Fig. 8, I show a construction similar to that shown in Fig. 6, with the exception that the springs 57 and 58 are pivotally mounted upon arms 59 and 60, in order that they may engage with the teeth 61, on the arms 62, and so that they may be swung horizontally out of engagement with said teeth on the arms 62.

Fender arms 63, in the modification shown in Fig. 10, are supported in the normally raised position from their central portion 64 by means of coiled springs 65 connected by a chain 66 to the car body 67.

In Fig. 11, I show still another modification of a fender suspending means, which consists of a weight 68, attached to the inner end of the normally horizontal lever portion 69, projecting from the upper end 70 of the fender frame arm 71, which is pivoted within the bifurcated arm 72 by a bolt 73.

Having now described my invention, what I claim as new and desire to secure by Letters Patent is:—

1. A fender having arms, the inner ends of which are pivotally mounted, projections on said ends and springs bearing thereagainst whereby the fender is held suspended.

2. A fender having arms, the inner ends of which are pivotally mounted, projections on said ends and springs bearing thereagainst whereby the fender is held suspended, said fender adapted to be tripped against the action of said springs.

3. A fender having arms, the inner ends of which are pivotally mounted, projections on said ends and springs bearing thereagainst whereby the fender is held suspended, said fender adapted to be tripped against the action of said springs, and means whereby the fender will be held in tripped position.

4. A fender having arms, the inner ends of which are pivotally mounted, projections on said ends and springs bearing thereagainst whereby the fender is held suspended, said fender adapted to be tripped against the action of said springs, and means whereby the fender will be held in tripped position, against the action of said springs.

5. A fender having arms, the inner ends of which are pivotally mounted, projections on said ends and springs bearing thereagainst whereby the fender is held suspended, said fender adapted to be tripped against the action of said springs, means whereby the fender will be held in tripped position against the action of said springs, and supports upon which said arms are pivoted.

6. A fender having arms, the inner ends of which are pivotally mounted, projections on said ends and springs bearing thereagainst whereby the fender is held suspended, said fender adapted to be tripped against the action of said springs, means whereby the fender will be held in tripped position against the action of said springs, supports upon which said arms are pivoted, and said supports being horizontally movable.

7. A fender having arms, the inner ends of which are pivotally mounted, projections on said ends and springs bearing thereagainst whereby the fender is held suspended, said fender adapted to be tripped against the action of said springs, means whereby the fender will be held in tripped position against the action of said springs, supports upon which said arms are pivoted, said supports being horizontally movable, and a pivoted bar by which supports are carried.

8. In combination a vehicle, a fender support pivoted to the frame thereof and a fender pivoted to said support, said support consisting of a pair of arms connected to a transverse rod, a bar upon which said arms are slidable, and means on said fender for engagement with the tire of a wheel.

9. In combination a vehicle, a fender support pivoted to the frame thereof and a fender pivoted to said support, said support consisting of a pair of arms connected to a transverse rod, a bar upon which said arms are slidable, and means on said fender for engagement with the tire of a wheel whereby said fender may have horizontal movement.

10. In combination a vehicle, a fender support pivoted to the frame thereof and a fender pivoted to said support, said support consisting of a pair of arms connected to a transverse rod, a bar upon which said arms are slidable, and means on said fender for engagement with the tire of a wheel whereby said fender may have horizontal movement, said means consisting of rollers.

11. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, and means for holding said fender normally out of contact with the ground.

12. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, and means for holding said fender normally out of contact with the ground, said means consisting of springs.

13. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, and means for holding said fender normally out of contact with the ground, said means consisting of springs on said arms.

14. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, and means for holding said fender resiliently suspended.

15. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, and means for holding said fender resiliently suspended, said means consisting of springs.

16. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, and means for holding said fender resiliently suspended, said means consisting of springs connected to said arms.

17. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, means for holding said fender resiliently suspended, said means consisting of springs connected to said arms, and a roller extending across the forward end of said fender.

18. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, means for holding said fender resiliently suspended, said means consisting of springs connected to said arms, a roller extending across the forward end of said fender, and wheels mounted upon the opposite ends of said roller.

19. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, means for holding said fender resiliently suspended, said means consisting of springs connected to said arms, a roller extending across the forward end of said fender, and wheels mounted upon the opposite ends of said roller, said roller having horizontal movement.

20. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, means for holding said fender resiliently suspended, said means consisting of springs connected to said arms, a roller extending across the forward end of said fender, wheels mounted upon the opposite ends of said roller, said roller having horizontal movement, and slidable bearings whereby said horizontal movement of said roller is had.

21. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, means for holding said fender resiliently suspended, said means consisting of springs connected to said arms, a roller extending across the forward end of said fender, wheels mounted upon the opposite ends of said roller, said roller having horizontal movement, and slidable bearings whereby said horizontal movement of said roller is had, said bearings being spring controlled.

22. In combination a vehicle, a fender support pivoted to the frame thereof and a fender pivoted to said support, said support consisting of a pair of arms connected to a transverse rod, a bar upon which said arms are slidable, means on said fender for engagement with the tire of a wheel whereby said fender may have horizontal movement, said means consisting of rollers, means for holding said fender resiliently suspended, said means consisting of springs connected to said arms, a roller extending across the forward end of said fender, wheels mounted upon the opposite ends of said roller, said roller having horizontal movement, and slidable bearings whereby said horizontal movement of said roller is had, said bearings being spring controlled, whereby said bearings are held normally in the front ends of said slots.

23. A fender having arms, the inner ends of which are pivotally mounted, projections on said ends and springs bearing thereagainst whereby the fender is held suspended, said fender adapted to be tripped against the action of said springs, means whereby the fender will be held in tripped position against the action of said springs, supports upon which said arms are pivoted, said supports being horizontally movable, a pivoted bar by which supports are carried, and means for rotating said fender.

24. A fender having arms, the inner ends of which are pivotally mounted, projections on said ends and springs bearing thereagainst whereby the fender is held suspended, said fender adapted to be tripped against the action of said springs, means whereby the fender will be held in tripped position against the action of said springs, supports upon which said arms are pivoted, said supports being horizontally movable, a pivoted bar by which supports are carried, means for rotating said fender, said means consisting of spools connected to the fender and actuated by the tires of a vehicle on which the fender is mounted.

In testimony whereof I affix my signature in presence of two witnesses.

ALEXANDER McCORD BURTON.

Witnesses:
MARGARET J. BURTON,
G. J. BLEICHNER.

Copies of this patent may be obtained for five cents each, by addressing the "Commissioner of Patents, Washington, D. C."